Patented Aug. 25, 1936

2,052,236

UNITED STATES PATENT OFFICE 2,052,236

METHOD FOR SEPARATION OF ALUMINIUM OXIDE FROM RAW MATERIAL

Karl Helge Sigfrid Löfquist, Stockholm, Sweden

No Drawing. Application December 6, 1935, Serial No. 53,271. In Sweden December 10, 1934

16 Claims. (Cl. 23—142)

The present invention considers a method for separation of aluminium oxide, $Al_2O_3$, from raw material, which besides $Al_2O_3$ contains mainly one or several of certain acid oxides, that means oxides, which are able to form salts with basic oxides, as for instance silicium dioxide, $SiO_2$ and titanium dioxide, $TiO_2$, by forming a melt in which after freezing $Al_2O_3$ occurs mainly in the form of grains or crystals of free $Al_2O_3$, while the acid oxide or oxides as for instance $SiO_2$ and/or $TiO_2$ are chemically combined with a basic oxide, that means in the examples given as silicate or titanate, whereupon $Al_2O_3$ is separated from the solidified melt by means of some separation process, as for instance gravity concentration or flotation. Chemical decomposition of the ground mass can also be used for separating this mass from $Al_2O_3$.

Such a melt is obtained according to the present invention by melting the raw material containing $Al_2O_3$ together with a certain amount of lead oxide, PbO, or some lead salt which on melting will give PbO, e. g. lead carbonate, $PbO-CO_2$, which by heating gives off $CO_2$ and forms PbO. By melting experiments made by me it was namely found that if a certain minimum amount of PbO is used in the melt its content of $SiO_2$ combines with PbO, forming Pb-silicate, and further that $TiO_2$ occurring, combines with PbO, forming Pb titanate, while on the contrary $Al_2O_3$ does not form any stable compound with PbO nor does it combine with $SiO_2$ to form Al-silicate, but on cooling and solidifying of the melt $Al_2O_3$ is separated in the form of grains or crystals of free $Al_2O_3$.

It is to be remarked, however, that, as already mentioned, a certain minimum amount of PbO is required in order really to obtain $Al_2O_3$ in the form of free $Al_2O_3$. By melting experiments made by me the following has been found regarding this amount of PbO required for a certain charge of $Al_2O_3$ and $SiO_2$.

According to the amount of added PbO in relation to the amount of $SiO_2$ occurring, different silicates as $PbO.SiO_2$, $2PbO.SiO_2$ and (though less stable) $4PbO.SiO_2$ may be formed. Thus, in one case with a melt containing 80% PbO, 16% $Al_2O_3$ and 4% $SiO_2$ crystals of the silicate $2PbO.SiO_2$ were obtained together with a certain amount of free PbO and crystals of $Al_2O_3$. The melting began at a temperature of 700° C. and the maximum temperature used was 900° C. when the whole charge was well molten. It also proved that the $Al_2O_3$-crystals were enriched towards the upper part of the melt, if it was left to cool slowly.

This shows that the $Al_2O_3$-crystals had been separated from the melt before it had solidified completely, and thereby, on account of their lower density, had risen in the heavier molten Pb-silicate. In another melt, containing 60% PbO, 15% $Al_2O_3$, and 25% $SiO_2$, the amount of added PbO was smaller than that which was required for binding the whole amount of $SiO_2$ to silicate, as it was found that part of $SiO_2$ combined with a stoichiometric amount of $Al_2O_3$ to form aluminium silicate. $3Al_2O_3.2SiO_2$ or possibly $Al_2O_3.SiO_2$, and besides that some free $SiO_2$ was obtained.

Therefore, in order to obtain the whole amount of $Al_2O_3$ in a free form the amount of added PbO should be at least so large that the whole amount of $SiO_2$ combines into Pb-silicate, that means the ratio $PbO:SiO_2$ must be at least as large as it is given by the formula $PbO.SiO_2$. In order to obtain a lower melting point and viscosity of the melt and also in order to facilitate the decomposition of the Pb-silicate formed, for recovering the PbO used, it has proved suitable to calculate the amount of PbO at least so high that the silicate $2PbO.SiO_2$ is formed.

For the oxide $TiO_2$ similar conditions have been found to prevail on experiments made. PbO and $TiO_2$ form Pb-titanate by melting. Thus it may be stated, that if a material, which besides $Al_2O_3$ contains mainly $SiO_2$ and $TiO_2$ is melted with the minimum amount of PbO stoichiometrically calculated as described, free $Al_2O_3$ will be formed in the cooling melt, while $SiO_2$ and $TiO_2$ form Pb-silicate and Pb-titanate respectively.

The composition of the charge may however preferably be restricted also in regard to its content of $Al_2O_3$. It was namely found that with increasing percentages of $Al_2O_3$ the temperature which is required for melting increases very rapidly, and with increasing temperature PbO evaporates strongly, which causes losses of PbO before the charge is quite molten, or even it will make a homogeneous melting very difficult. On account of that the content of $Al_2O_3$ in the charge should preferably not exceed about 35%, which corresponds to a melting temperature of approximately somewhat more than 1000° C., slightly varying also with the content of $SiO_2$.

As an example may be mentioned that a quiet and good melting without any losses worth mentioning of PbO was obtained at 900° C. with a charge consisting of 80% PbO, 16% $Al_2O_3$ and 4% $SiO_2$, while another charge with 30% $Al_2O_3$ gave perceptible losses of PbO at a melting temperature used of about 1100° C.

Considering the molecular weights of $PbO=223$ and of $SiO_2=60$, the composition of a melt containing mainly PbO, $Al_2O_3$ and $SiO_2$, which will give a good melting without high vapour-losses of PbO, and with separation of free $Al_2O_3$ on cooling, will be determined by the following conditions.

The weight content of PbO shall be at least $223/60=3.8$ times the content of $SiO_2$, or, better, at least $2\times223/60=7.6$ times the content of $SiO_2$, and the weight content of $Al_2O_3$, ought to be less than about 35%, or preferably about 10–20%. A mean value for the PbO-content of at least about 5 times the content of $SiO_2$ may also be used. By means of these figures the weight content of PbO needed for any charge of $Al_2O_3$ and $SiO_2$ may be calculated, as will be shown by an example. A material containing 80% $Al_2O_3$ and 20% $SiO_2$ is given. For 100 parts of that material is required at least $3.8\times20=76$ parts of PbO, or preferably at least $7.6\times20=152$ parts of PbO. The mixture's content of $Al_2O_3$ will in the first case be $$\frac{80\times100}{176}=45.5$$

and in the second case $$\frac{80\times100}{252}=32\%$$

Thus, in the first case the content of $Al_2O_3$ is too high, and in the second case it is just about the described upper limit of 35%, mentioned above. By adding some further amount of PbO or PbO-rich silicate, easily calculated, the $Al_2O_3$ content can be lowered, for instance down to 10–20% so as to give a charge of a suitable low melting point, as described in the foregoing.

For $TiO_2$ a similar stoichiometric calculation can be made. Considering the molecular weight of $TiO_2=80$, the amount of PbO required for binding $TiO_2$ will be at least $223/80=2.8$ times the weight-amount of $TiO_2$ (or better $2\times223/80=5.6$ times the weight amount of $TiO_2$). A mean value of at least about 4 times the $TiO_2$ content may also be used. When $SiO_2$ and $TiO_2$ occur together the amounts of PbO required for each of them are to be summarized. Stoichiometrically one part by weight of $TiO_2$ is equivalent to ¾ part of $SiO_2$, which may be used for facilitating the calculation of the amount of PbO required.

For separating $Al_2O_3$ as far as possible in a quantitative way from the acid oxides $SiO_2$ and $TiO_2$ the melt should not contain any appreciable amount of other basic oxides as FeO, CaO, MgO, $Na_2O$, $K_2O$ because such oxides, in the presence of $Al_2O_3$, are able to form aluminates and if $SiO_2$ also be present, they are able to form silicate-aluminates, which of course implies a decrease of the amount of free $Al_2O_3$. Therefore, if such oxides occur in the raw material to be treated their amount should preferably be decreased before melting with PbO, by some preliminary treatment of the raw material. Such removal is not necessary however, but is to be preferred as it will result in a higher yield of $Al_2O_3$.

An application of industrial importance of this method is the recovery of $Al_2O_3$ from certain raw materials, occurring in nature, for the production of Al. Other ranges of application also occur, as will be mentioned in the following.

Raw materials occurring in nature containing $Al_2O_3$, which are suitable for treatment by this method are primarily bauxites, clays and lather-ites. Besides $Al_2O_3$, $SiO_2$, $TiO_2$ and $H_2O$ these materials contain only $Fe_2O_3$ in some appreciable amount. $Fe_2O_3$ can be removed almost completely by means of several known processes amongst which may be mentioned reduction to FeO, followed by leaching with acid, reduction to $Fe_3O_4$ and magnetical separation, or removal in chlorine gas. The hydrate water can be removed as vapour by heating to at least 600° C. It may be mentioned that $TiO_2$ can be removed by some similar preliminary treatment as for instance in a stream of chlorine gas, according to what is already known.

A "dark", that means $Fe_2O_3$-rich bauxite, of the analysis 58% $Al_2O_3$, 3% $SiO_2$, 13% $H_2O$, 23% $Fe_2O_3$, 3% $TiO_2$ may be assumed. After removing Fe and $H_2O$ as has been described the material will consist of 91% $Al_2O_3$, 4.5% $SiO_2$ and 4.5% $TiO_2$. This charge is mixed with PbO in sufficient amounts to combine with $SiO_2$ and $TiO_2$ to form $PbO.SiO_2$ and $PbO.TiO_2$, or, better, so that $2PbO.SiO_2$ and $2PbO.TiO_2$ are formed. As however in this case the content of the refractory substance $Al_2O_3$ is high as compared with the content of $SiO_2$ a certain amount of PbO or Pb-silicate is added besides the stoichiometrically calculated amount of PbO so that the content of $Al_2O_3$ will be about 10–20% and the total amount of PbO will be of the order of magnitude 70–80%. After melting together at a temperature of 800–900° C. the melt is left to cool slowly in moulds, whereby relatively large crystals of $Al_2O_3$ are obtained in a ground mass of PbO, Pb-silicate and Pb-titanate.

For facilitating the enrichment of the lighter $Al_2O_3$ towards the top of the melt, a slow cooling by which $Al_2O_3$ falls out of solution can be followed by a rapid heating when $Al_2O_3$ rises in the liquid mass. This cooling and heating can be made in the moulds or even in the melting furnace used. Centrifuging of the melt can also be used. After crushing, the lighter $Al_2O_3$ is separated from the heavier Pb-compounds for instance by means of some gravity concentration process, or eventually by flotation.

The recovery of PbO, which is of importance for the economy of the process, can be made in different ways, as for instance chemically by leaching the ground mass containing Pb-silicate and Pb-titanate with certain acids, giving Pb-salts, from which PbO and the acid used are recovered. Also metallurgical recovery of PbO by reduction to Pb and subsequent oxidation to PbO can be used. $TiO_2$ can be recovered from the Pb-titanate by different chemical or metallurgical methods.

For the separation of $Al_2O_3$ from $SiO_2$ formed at the chemical decomposition of the silicate, in such cases where no mechanical separation or only a partial separation of $Al_2O_3$ from the ground mass of Pb-silicate has occurred, separation by means of the "heavy liquid" molten Pb-acetate (melting point 75° C.) can be used. The Pb-acetate hereby used may wholly or partially be obtained by decomposition of the Pb-silicate in dilute acetic acid or in acid Pb-acetate. Some experiments made have proved, that $Al_2O_3$ subsides to the bottom in the acetate melt while $SiO_2$ rises to the surface. The same method can be used for the separation of $SiO_2$ from $TiO_2$ by decomposition in acid of the Pb-silicate-titanate mixture and treating the mixture $SiO_2$ and $TiO_2$ with molten Pb-acetate. In this way $SiO_2$ and $TiO_2$ can be obtained in free form in separate fractions as by-products.

Al₂O₃ obtained by this method can be used for the production of Al in already known methods, by electrolysis of molten Al₂O₃. It might also be used as a grinding material as it is obtained in the form of crystals. It may also be used for the production of refractory bricks. By regulating the cooling velocity at the cooling of the melt, the magnitude of the Al₂O₃ crystals can to some extent be regulated, as a slow cooling will give large crystals and the reverse.

In order to lower the melting temperature and the viscosity of the charge addition can be made of substances which are soluble in the melt without having any chemical influence on Al₂O₃. Such substances are for instance certain sulphides as PbS and Cu₂S as has been proved by melting experiments made by me. Also haloides of Pb and PbCl₂ might be used.

Having now described my invention, what I claim as new and desired to secure by Letters Patent is:

1. The process of separating aluminium oxide from raw material, containing besides aluminium oxide mainly silicium dioxide, comprising forming a melt containing the raw material and lead oxide in such amounts that the weight content of lead oxide is at least 3.8 times the content of silicium dioxide, cooling the melt slowly and separating the grains of aluminium oxide formed in the cooling melt from the siliceous ground mass.

2. The process of separating aluminium oxide from raw material, containing besides aluminium oxide mainly silicium dioxide, comprising forming a melt containing the raw material and lead oxide in such amounts that the weight content of lead oxide is at least 7.6 times the content of silicium dioxide, cooling the melt slowly and separating the grains of aluminium oxide formed in the cooling melt from the siliceous ground mass.

3. The process of separating aluminium oxide from raw material, containing besides aluminium oxide mainly silicium dioxide, comprising forming a melt containing the raw material and lead oxide in such amounts that the weight content of lead oxide is at least 3.8 times the content of silicium dioxide and the weight content of aluminium oxide less than about 35%, cooling the melt slowly and separating the grains of aluminium oxide formed in the cooling melt from the siliceous ground mass.

4. The process of separating aluminium oxide from raw material, containing besides aluminium oxide mainly silicium dioxide, comprising forming a melt containing the raw material and lead oxide in such amounts that the weight content of lead oxide is at least 7.6 times the content of silicium dioxide and the weight content of aluminium oxide less than about 35%, cooling the melt slowly and separating the grains of aluminium oxide formed in the cooling melt from the siliceous ground mass.

5. The process of separating aluminium oxide from raw material, containing besides aluminium oxide mainly titanium dioxide, comprising forming a melt containing the raw material and lead oxide in such amounts that the weight content of lead oxide is at least 2.8 times the content of titanium dioxide, cooling the melt slowly and separating the grains of aluminium oxide formed in the cooling melt from the ground mass.

6. The process of separating aluminium oxide from raw material, containing besides aluminium oxide mainly titanium dioxide, comprising forming a melt containing the raw material and lead oxide in such amounts that the weight content of lead oxide is at least 5.6 times the content of titanium dioxide, cooling the melt slowly and separating the grains of aluminium oxide formed in the cooling melt from the ground mass.

7. The process of separating aluminium oxide from raw material, containing besides aluminium oxide mainly titanium dioxide, comprising forming a melt containing the raw material and lead oxide in such amounts that the weight content of lead oxide is at least 2.8 times the content of titanium dioxide and the weight content of aluminium oxide less than about 35%, cooling the melt slowly and separating the grains of aluminium oxide formed in the cooling melt from the ground mass.

8. The process of separating aluminium oxide from raw material, containing besides aluminium oxide mainly titanium dioxide, comprising forming a melt containing the raw material and lead oxide in such amounts that the weight content of lead oxide is at least 5.6 times the content of titanium dioxide and the weight content of aluminium oxide less than about 35%, cooling the melt slowly and separating the grains of aluminium oxide formed in the cooling melt from the ground mass.

9. The process of separating aluminium oxide from raw material, containing besides aluminium oxide mainly silicium dioxide and titanium dioxide, comprising forming a melt containing the raw material and lead oxide in such amounts that the weight content of lead oxide is at least 3.8 times the content of silicium dioxide plus 2.8 times the content of titanium dioxide, cooling the melt slowly and separating the grains of aluminium oxide formed in the cooling melt from the ground mass.

10. The process of separating aluminium oxide from raw material, containing besides aluminium oxide mainly silicium dioxide and titanium dioxide, comprising forming a melt containing the raw material and lead oxide in such amounts that the weight content of lead oxide is at least 7.6 times the content of silicium dioxide plus 5.6 times the content of titanium dioxide, cooling the melt slowly and separating the grains of aluminium oxide formed in the cooling melt from the ground mass.

11. The process of separating aluminium oxide from raw material, containing besides aluminium oxide mainly silicium dioxide and titanium dioxide, comprising forming a melt containing the raw materal and lead oxide in such amounts that the weight content of lead oxide is at least 3.8 times the content of silicium dioxide plus 2.8 times the content of titanium dioxide and the weight content of aluminium dioxide less than about 35%, cooling the melt slowly and separating the grains of aluminium oxide formed in the cooling melt from the ground mass.

12. The process of separating aluminium oxide from raw material, containing besides aluminium oxide mainly silicium dioxide and titanium dioxide, comprising forming a melt containing the raw material and lead oxide in such amounts that the weight content of lead oxide is at least 7.6 times the content of silicium dioxide plus 5.6 times the content of titanium dioxide and the weight content of aluminium oxide less than about 35%, cooling the melt slowly and separating the grains of aluminium oxide formed in the cooling melt from the ground mass.

13. The process of separating aluminium oxide from raw material, containing besides aluminium oxide mainly silicium dioxide and/or titanium dioxide by forming a melt containing the raw material and lead oxide, comprising a slow cooling of the melt for separation of grains of aluminium oxide followed by a rapid heating for flotation of these grains towards the upper surface of the melt.

14. The process of separating aluminium oxide from raw material, containing besides aluminium oxide mainly silicium dioxide and/or titanium dioxide by forming a melt containing the raw material and lead oxide, comprising a slow cooling of the melt for separation of grains of aluminium oxide, followed by a rapid heating and centrifuging of the melt for accelerated separation of these grains.

15. The process of separating aluminium oxide from raw material, containing besides aluminium oxide mainly silicium dioxide by forming a melt containing the raw material and lead oxide and cooling the melt slowly, comprising treating the cooled and crushed melt with acetic acid so as to form lead acetate and a mixture of aluminium oxide and silicium dioxide, and melting the lead acetate whereby aluminium oxide sinks to the bottom, and silicium dioxide rises towards the surface of the molten acetate.

16. The process as claimed in claim 15, comprising treating the cooled and crushed melt with some acid which dissolves lead oxide and melting the residue of aluminium oxide and silicium dioxide with lead acetate.

KARL HELGE SIGFRID LÖFQUIST.